(12) United States Patent
Hamano et al.

(10) Patent No.: US 8,416,573 B2
(45) Date of Patent: Apr. 9, 2013

(54) FLUID COOLING

(75) Inventors: Yoko Hamano, Tokyo (JP); Takahisa Kusuura, Kanagawa (JP)

(73) Assignee: Empire Technology Development LLC., Wilmington, DE (US)

( * ) Notice: Subject to any disclaimer, the term of this patent is extended or adjusted under 35 U.S.C. 154(b) by 0 days.

(21) Appl. No.: 13/122,877

(22) PCT Filed: Aug. 10, 2010

(86) PCT No.: PCT/JP2010/005030
§ 371 (c)(1),
(2), (4) Date: Apr. 6, 2011

(87) PCT Pub. No.: WO2012/020453
PCT Pub. Date: Feb. 16, 2012

(65) Prior Publication Data
US 2012/0037341 A1  Feb. 16, 2012

(51) Int. Cl.
*H05K 7/20* (2006.01)

(52) U.S. Cl.
USPC ........... 361/699; 361/688; 361/689; 361/690; 361/694; 361/695; 361/698; 361/701; 165/80.4; 165/104.33

(58) Field of Classification Search .................. None
See application file for complete search history.

(56) References Cited

U.S. PATENT DOCUMENTS

| | | | |
|---|---|---|---|
| 5,325,880 A | 7/1994 | Johnson et al. | |
| 6,691,977 B2 | 2/2004 | Knebel et al. | |
| 7,107,777 B2 * | 9/2006 | Vaiyapuri et al. | 62/259.2 |
| 7,422,192 B2 | 9/2008 | Biasiotto et al. | |
| 7,445,616 B2 * | 11/2008 | Petrakis | 604/890.1 |
| 7,476,224 B2 * | 1/2009 | Petrakis | 604/890.1 |
| 7,539,020 B2 * | 5/2009 | Chow et al. | 361/726 |
| 7,673,591 B2 | 3/2010 | Vuk | |
| 7,778,029 B2 * | 8/2010 | Ueno | 361/695 |
| 7,965,508 B2 * | 6/2011 | Yamamoto et al. | 361/699 |
| 2009/0218087 A1 * | 9/2009 | Oshima | 165/185 |
| 2009/0301410 A1 | 12/2009 | Vuk | |
| 2012/0180474 A1 * | 7/2012 | Matsuki | 60/528 |

FOREIGN PATENT DOCUMENTS

| | | | |
|---|---|---|---|
| JP | 63237554 A | 10/1988 | |
| JP | 63237555 A | 10/1988 | |
| JP | 02116786 A | 5/1990 | |
| JP | 04152659 A | 5/1992 | |
| JP | 04291751 A | 10/1992 | |
| JP | 05011471 A | 1/1993 | |
| JP | 05019512 A | 1/1993 | |

(Continued)

OTHER PUBLICATIONS

"Shape Memory Alloy and Superelastic Alloy of About Koga (Furukawa NT alloy)," accessed at URL: http://www.fitec.co.jp/ftm/nt/aboutnt.htm on May 21, 2012, 3 pages.

Adaptec Support Knowledgebase, "Adaptec Intelligent Power Management FAQs," http://ask.adaptec.com/app/answers/detail/a_id/15343, Sep. 1, 2008, 6 pages.

Furukawa Techno Material Co., "Koga Alloy Superelastic Shape Memory Alloys (Alloys Furukawa NT)", www.fitec.com.jp/ftm/nt/aboutnt.htm, 2006, Accessed Jan. 13, 2011.

(Continued)

*Primary Examiner* — Boris Chervinsky
(74) *Attorney, Agent, or Firm* — Woodcock Washburn LLP

(57) ABSTRACT

A fluid cooling system comprising a pipe unit through which coolant fluid flows. The pipe unit is provided with one or more actuators at least a part of which is formed of shape memory alloy. The actuators are configured to extend by applied heat.

24 Claims, 10 Drawing Sheets

FOREIGN PATENT DOCUMENTS

| | | |
|---|---|---|
| JP | 1993-011471 | 2/1993 |
| JP | 5-195124 | 8/1993 |
| JP | 06155073 A | 6/1994 |
| JP | 3033583 B2 | 4/2000 |
| JP | 2007 258548 A | 10/2007 |
| JP | 2008 287733 A | 11/2008 |

OTHER PUBLICATIONS

PCT Application No. PCT/JP2010/005030, International Search Report, Filing Date: Aug. 8, 2010, Mailing Date: Dec. 14, 2010, 7 pages.

* cited by examiner

FLUID COOLING

CROSS-REFERENCE TO RELATED APPLICATIONS

This application is the National Stage of International Application No. PCT/JP2010/005030, filed Aug. 10, 2010, the disclosure of which is incorporated herein by reference in its entirety.

BACKGROUND

To dissipate heat from electronic devices such as a processor for a computer device, liquid cooling systems are commonly used because of their enhanced heat transfer efficiency as compared to conventional air cooling systems. A typical liquid cooling system includes one or more closed loop pipe units through which coolant liquid is circulated. Such a pipe unit is arranged to be placed around electronic devices to be cooled. Heat generated by electronic devices is conducted to the coolant liquid and carried to a radiator where the heat is radiated to the ambient air.

With the continuing trend of rapid increase in processor speed, it is desired to cool such high-speed processors, which are likely to generate more heat, in a more efficient manner. There is also another trend towards compact casings for servers and portable computers which prefer more compact cooling system. It is, therefore, desired to achieve a more compact cooling system without compromising cooling capability.

SUMMARY

Example embodiments relate to a fluid cooling system, comprising a pipe unit through which a cooling fluid flows; and an actuator disposed on the pipe unit, wherein at least a portion of each of the actuator comprises a shape memory alloy. The actuator may extend when heated to a temperature either at or above a transition temperature to deform at a least portion of the pipe unit.

According to one embodiment, the at least portion of the pipe unit deforms outwardly in a radial direction of the pipe unit. In another aspect, the actuator includes a shape memory spring formed of shape memory alloy and a bias spring. The shape memory spring may restore a memorized extended shape when heated to a temperature either at or above the transition temperature and is biased by the bias spring in a retracted position when cooled to a temperature below the transition temperature.

In another aspect, the shape memory spring may be arranged substantially parallel to the bias spring. In another aspect, the shape memory spring may be arranged concentrically with the bias spring. In another aspect, the shape memory spring may be arranged in series with the bias spring.

According to one embodiment, a plurality of actuators may be spaced from one another along the longitudinal direction of the pipe unit. In another aspect, the pipe unit may be mounted on a housing comprising one or more server modules; and wherein said one or more server modules include one or more electronic devices which are provided on at least one side of a mother board. In another aspect, the one or more electronic devices may be mounted on one side on the mother board and the pipe unit is mounted on opposite side of the mother board. In another aspect, the pipe unit may be arranged such that at least a part of the pipe unit is opposite to the one or more electronic devices.

According to one embodiment, the shape memory spring may be configured to be heated to a temperature either at or above the transition temperature by thermal conduction from at least one of the one or more electronic devices. In another aspect, the shape memory spring may be arranged such that the shape memory spring extends in a direction parallel to the mother board. In another aspect, the shape memory spring may be formed of an alloy selected from the group consisting of Ni—Ti alloy, Ni—Ti—Fe alloy, Ni—Ti—Cu alloy, and combinations thereof. In another aspect, the pipe unit may be formed of a super elastic alloy. In another aspect, the super elastic alloy may be selected from the group consisting of Ni—Ti alloy, Ni—Ti—Fe alloy, Ni—Ti—Cu alloy, and combinations thereof. In another aspect, the shape memory spring may be welded to the pipe unit using a welding material formed of a same type of a super elastic alloy as that of the pipe unit.

According to one embodiment, the pipe unit may be formed of an elastomer. In another aspect, the elastomer may be selected from the group consisting of fluorinated elastomer, silicon elastomer, perfluoroelastomer, aramid elastomer, and combinations thereof.

According to one embodiment, the fluid cooling system may further comprise a pump for supplying the cooling fluid. According to one embodiment, the fluid cooling system may further comprise a radiator connected to the pump for dissipating heat from the cooling fluid. In another aspect, the cooling fluid may substantially comprise water. In another aspect, the cooling fluid may substantially comprise oil.

Other example embodiments relate to a method for assembling a pipe unit for a fluid cooling system, comprising providing a pipe section; attaching a first spring formed of a shape memory alloy and a bias spring; joining a plurality of the pipe sections end to end.

Other example embodiments relate to a pipe section, comprising; an elongated body having a shape to allow a fluid to flow; an actuator disposed on the elongated body, wherein at least a portion of the actuator is formed of a shape memory alloy; wherein the actuator extends when heated to a temperature to either at or above a transition temperature to deform at least portions of the elongated body.

DESCRIPTION OF EMBODIMENTS

Figure 1:
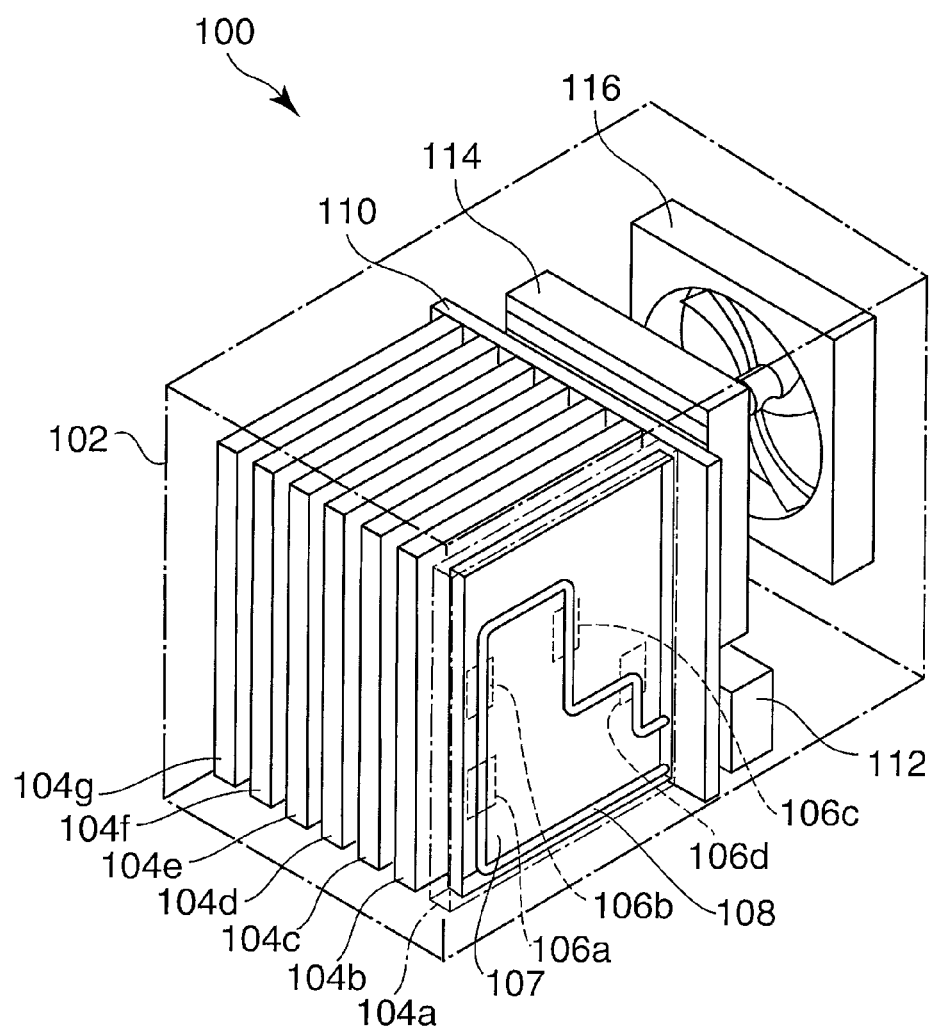
FIG. 1 illustrates a schematic perspective view of an example fluid cooling system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

Figure 2:
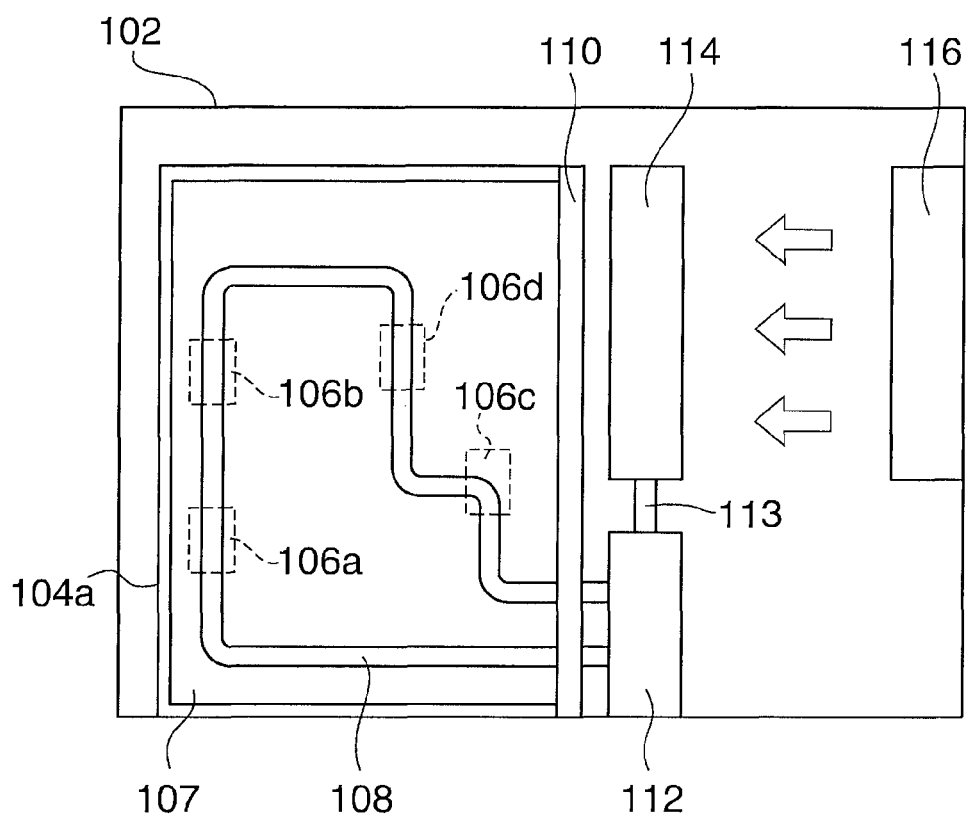
FIG. 2 illustrates a schematic front elevation view of an example fluid cooling system according to one embodiment.
Figure 3:
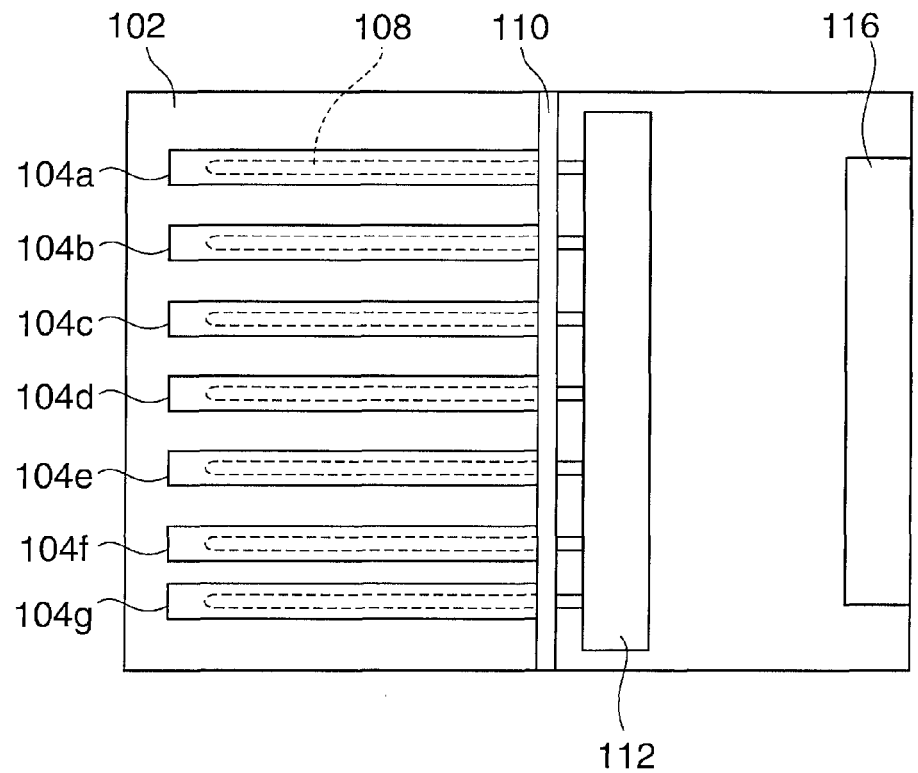
FIG. 3 illustrates a schematic bottom view of an example fluid cooling system according to one embodiment.
Figure 6A:
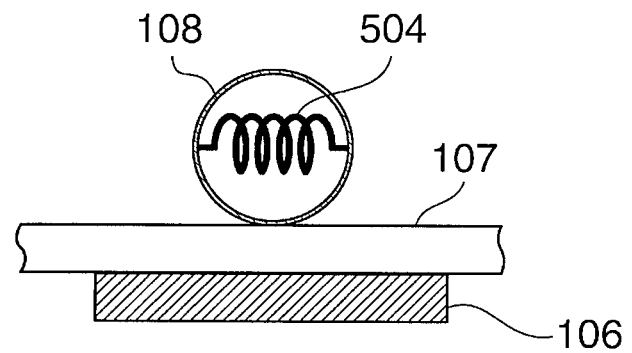
FIG. 6A illustrates a cross sectional view cut along with A-A line shown in FIG. 5A.
Figure 6B:
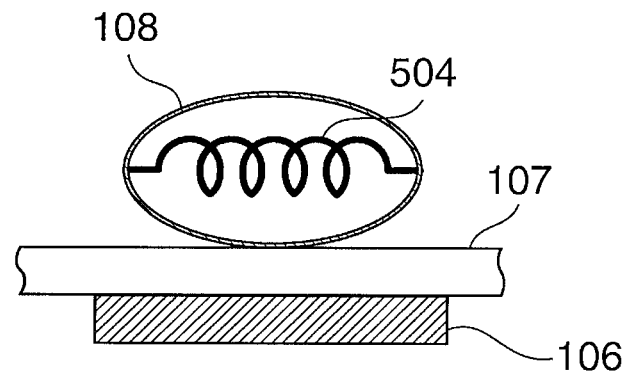
FIG. 6B illustrates a cross sectional view cut along with A-A line shown in FIG. 5A.

A schematic illustration of an embodiment is illustrated in FIGS. 1-3. FIG. 1 illustrates a schematic perspective view of an example embodiment of a fluid cooling system. In this embodiment, an example cooling system 100 comprises a housing 112 for a plurality of server modules 104a-104g. Each of the plurality of server modules 104a-104g is detachably fixed to supporting board 110 which upwardly protrudes from the bottom surface of the housing 102. Mounted on each of the plurality of server modules 104a-104g are one or more electronic devices 106a-106d such as a processor. For example, as schematically shown in FIG. 1, server module 104a may be provided with four electronic devices 106a-106d on one surface of a mother board 107. Disposed on the opposite surface of the mother board 107 is a pipe unit 108 through which coolant fluid flows. The pipe unit 108 is arranged to contact each of the electronic devices 106a-106d through the intermediary of the mother board 107, as also shown in FIGS. 6A and 6B, so as to carry a heat generated by each of the electronic devices 106a-106d to the coolant fluid.

The pipe unit 108 passes through openings formed on the supporting board 110 to be connected to pump 112. In one embodiment, the pipe unit 108 is detachably connected to the pump 112 so that the pipe unit 118 may be readily disengaged from the pump 112 in detaching the server module 104a from the housing 112 for maintenance, for example. The pump 112 is mounted on the bottom surface of the housing 102 adjacent to the supporting board 110.

Referring again to FIG. 2, disposed above the pump 112 is radiator 114 which includes micro-channels and a plurality of fins. The radiator 114 is connected to the pump 112 via a pair of connecting pipes 113, as shown in FIG. 2. One of the connecting pipes 113 allows the coolant fluid from the pump 112 to flow into the radiator 114. The connecting pipes 113 are joined to the edges of the micro-channels such that the coolant fluid from the connecting pipes 113 can smoothly flow into the radiator 114. Since heat carried by the coolant fluid is radiated from the fins provided adjacent to the micro-channels, the coolant fluid is cooled as it travels through the radiator 114. The cooled fluid returns to the pump 112 through the other section of the connecting pipes 113. Arranged opposing to the radiator 114 is a fan 116 which is supported on the rear wall of the housing 102. The fan 116 generates air flow across the radiator 114 to facilitate heat radiation.

For the purpose of clarity, a plurality of server modules 104a-104g herein may be collectively referred to as "server module 104". Likewise, electronic devices 106a-106d herein may be collectively referred to as "electronic devices 106".

Coolant fluid flowing through the pipe unit 108, connecting pipes 113 and the micro-channels in the radiator 114 may be any type of liquid having a high heat capacity, substantially including water and various types of oils, for example. Although water is the most typical coolant, various types of oils would be suitable, for example, for environments where the pipe unit 108 may be heated above the boiling temperature of water.

As schematically shown in FIG. 3, each of the server units 104 may be provided with pipe unit 108 which is detachably connected to the pump 112 in order to transfer heat generated by electronic devices 106 mounted on each of the server units 104 to the radiator 114. It is readily understood that the number and arrangement of electronic devices 106 may vary depending on the design of the circuit installed in each server module 104. The arrangement of the pipe unit 108 also may vary according to the arrangement of the electronic devices 106. The pipe unit 108 may be formed and arranged such that at least a part of the pipe unit 108 is opposite to the electronic devices 106 to facilitate conducting heat from those electronic devices 106 to the coolant fluid through the opposing part of the pipe unit 108.

Figure 4:
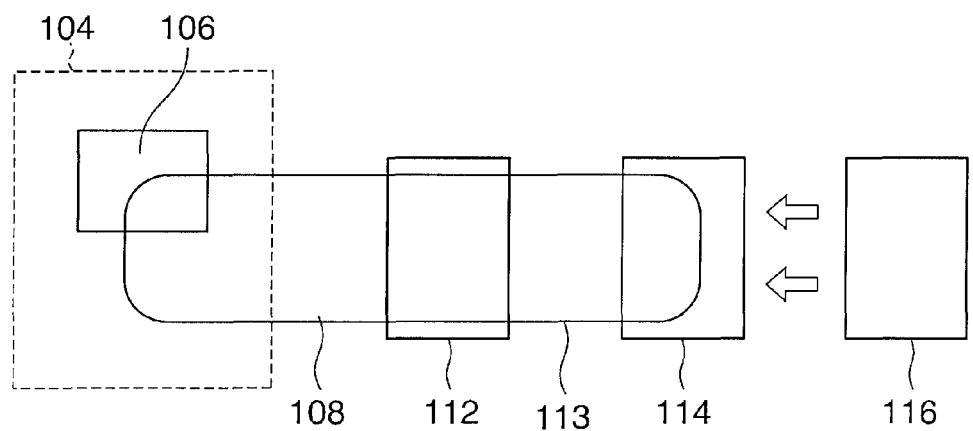
FIG. 4 illustrates a schematic block diagram of an example fluid cooling system according to one embodiment.

Based on the configurations described above, the pipe unit 108, pump 112, pipes 113 and micro-channels within the radiator 114 form a closed loop fluid channel, as shown in FIG. 4A. The closed loop fluid channel is configured to allow coolant fluid to travels along with the channel. As such, the coolant fluid may carry heat from the electronic devices 106 through the channel up to the radiator 114. That is, as the coolant fluid flows along with the fluid channel, the coolant fluid absorbs heat produced by the electronic devices 106 and eventually transfers the absorbed heat to the radiator 114 to dissipate the heat to the ambient air.

Figure 5A:
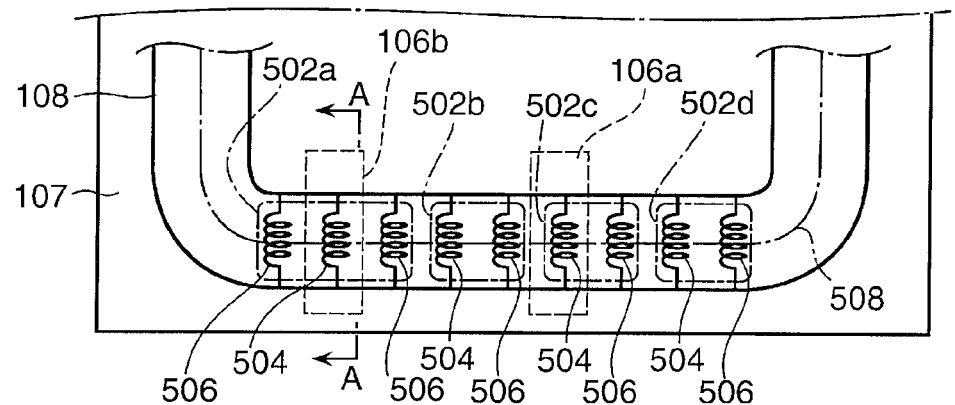
FIG. 5A illustrates a cross sectional view of an example pipe unit according to one embodiment.
Figure 5B:
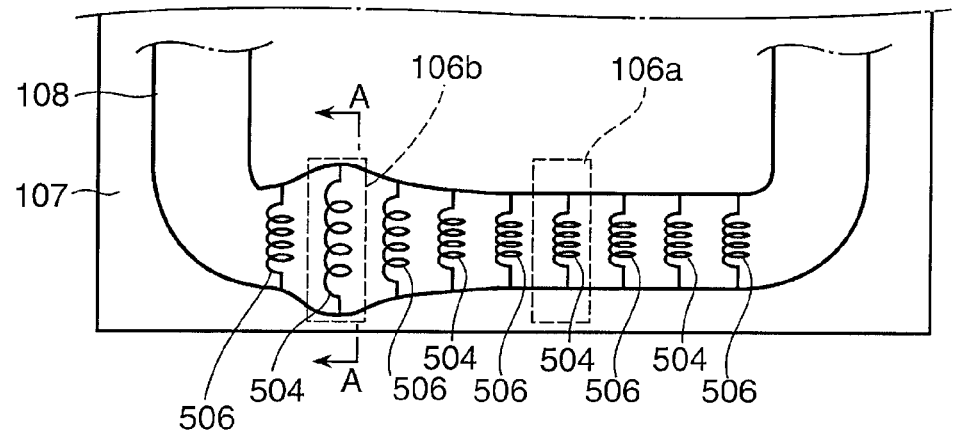
FIG. 5B illustrates a cross sectional view of an example pipe unit according to one embodiment.
Figure 5C:
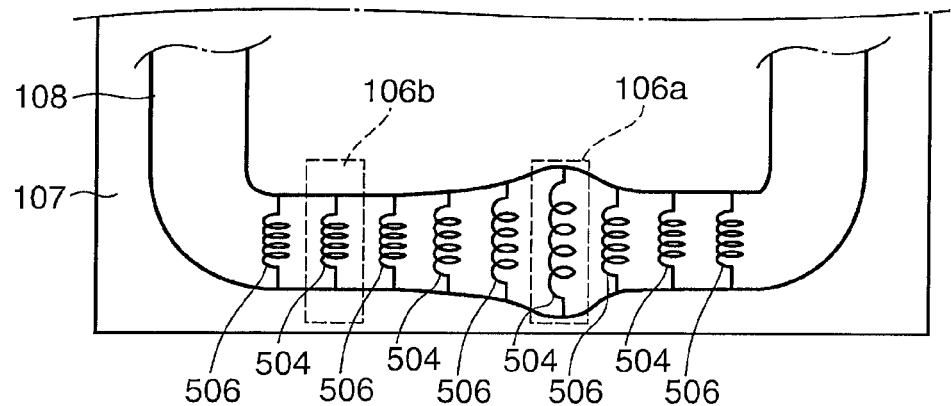
FIG. 5C illustrates a cross sectional view of an example pipe unit according to one embodiment.

Now, with reference to FIGS. 5A-5C and 6A-6B, various embodiments of the pipe unit 108 mounted on the fluid cooling system 100 will be explained further in detail. FIG. 5A-5C illustrate enlarged cross sectional views of the pipe unit 108 taken on a plane in parallel with the mother board 7. FIGS. 6A and 6B illustrate cross sectional views of the pipe unit 108 cut along with A-A line shown in FIG. 5.

As shown in FIGS. 5A-5C, the pipe unit 108 includes a plurality of actuators 502a-502d which may be activated by applied heat. At least a portion of each of the plurality of actuators 502a-502d at least a portion of each of the actuators 502a-502d comprises a shape memory alloy. In one embodiment, each of the actuators 502a-502d includes a pair of one or more shape memory springs 504 and one or more bias springs 506. For example, the actuator 502a includes one shape memory spring 504 and two bias springs 506 on the both sides of the shape memory spring 504, and each of the actuators 502b-502d is provided with one shape memory spring 504 and one bias spring 506. Each of the shape memory springs 504 is attached on the inner wall of the pipe unit 108 such that the longitudinal direction of each of the shape memory springs 504 is substantially perpendicular to the axial direction of the pipe unit 108, which is indicated by dashed line 508 in FIG. 5A. Each of the bias springs 506 is also attached on the inner wall of the pipe unit 108 in substantially parallel with the paired shape memory spring 504.

The actuators 502a-502d herein may be collectively referred to as "actuators 502" for clarity. The number of shape memory spring 504 and bias spring 506 included in each actuator 502 may vary depending on various factors such as material, resilience and shape of the pipe unit 108, for example.

In one embodiment, the pipe unit 108 is configured to be in an elongated cylindrical shape, for example. The pipe unit 108 may be formed of various types of super elastic alloy, such as including, but not limited to, Ni—Ti alloy, Ni—Ti—Fe alloy, Ni—Ti—Cu alloy, and combinations thereof. It is also possible to form the pipe unit 108 from various kinds of elastomer. The elastomer for the pipe unit may be heat resistant to approximately 200 degrees Celsius. Non limiting examples of such elastomer include fluorinated elastomer, silicon elastomer, perfluoroelastomer, aramid elastomer, and combinations thereof. The pipe unit 108 is configured to be deformable in response to stress which may be applied by the actuators 502.

The shape memory spring 504 may be formed of various kinds of shape memory alloys such as, for example, Ni—Ti alloy, Ni—Ti—Fe alloy, Ni—Ti—Cu alloy, and combinations thereof. Each of the shape memory spring 504 is resilient and configured to be deformable in response to applied stress while being below a transition temperature. Once heated to a temperature either at or above the transition temperature, each of the shape memory spring 504 may restore its memorized shape and maintain that memorized shape while being either on or above the transition temperature. In one embodiment, the transition temperature may be around 50 degrees Celsius. For example, a transition temperature of a type of Ni—Ti—Cu alloy may be adjusted around 50 degrees Celsius.

In one embodiment, the memorized shape of the shape memory spring 504 is an extended shape, as shown in FIG. 6B, for example. That is, the shape memory spring 504 may be configured to have a longer length along with its longitudinal direction in the extended shape than in a normal. In other words, the shape memory spring 504 may be in a contracted shape while being below its transition temperature, while the shape memory spring 504 may become in the extended shape once heated to a temperature either at or above the transition temperature. The length of the shape memory spring 504 along with its longitudinal direction is also longer than the diameter of the cross section of the pipe unit 108 so that, upon being heated to a temperature either at or above its transition temperature, the shape memory spring 504 can extend enough to deform at least portions of the pipe unit 108 outwardly in a radial direction of the pipe unit 108 against the tension of the adjacent bias springs 506, as shown in FIG. 6B. The bias springs 506 are configured to exert an inward bias to the outwardly deformed pipe unit 108 so that the pipe unit 108 can return to its original cylindrical shape, as shown in FIGS. 5A and 6A, once the shape memory spring 504 is cooled to a temperature below the transition temperature and the outward tension from the shape memory spring 504 is relaxed or no longer applied.

As noted above with reference to FIG. 1, the position of the pipe unit 108 on the mother board 7 may be adjusted such that at least one of the actuators 502 is opposite to at least one of the electronic devices 106. In one embodiment, as shown in FIGS. 5A-5C, the actuator 502a is opposite to the electronic device 106b and the actuator 502c is opposite to the electronic device 106a.

In operation, in response to thermal conduction from one of the heated electronic devices, for example, the electronic device 106b to the adjacent actuator 502a, the shape memory spring 504 included in the actuator 502a can be heated to a temperature either at or above its transition temperature, e.g., 50 degrees Celsius. Heat from the electronic device 106a is conducted, through the mother board 107 and a portion of the pipe unit 108 contacting with the mother board 107, to the shape memory spring 504. Upon being heated to a temperature at or above the transition temperature, the shape memory spring 504 restores its memorized extended shape, resulting in outwardly deforming at least portions of the pipe unit 108 adjacent to the extended shape memory spring 504, as shown in FIG. 5B. That is, by the tension from the shape memory spring 504 in the extended shape, the portions of the pipe unit 108 contacting with the shape memory spring 504 is caused to deform outwardly in a radial direction of the pipe unit 108.

Referring to FIGS. 6A and 6B, heat from the electronic devices 106b is also conducted through the pipe unit 108 to the coolant fluid. The coolant fluid carries the absorbed heat along with the pipe unit 108 eventually to the radiator 114 where the heat is radiated to the ambient air.

The amount of heat transferred from the electronic device 106b to the coolant fluid would increase if a larger amount of the coolant fluid exists adjacent to the electronic device 106b since a larger amount of fluid is capable to absorb more heat. Accordingly, the outwardly deformed portion of the pipe unit 108 may absorb more heat as compared to the remaining part which is not outwardly deformed. Thus, the pipe unit 108 may absorb more heat at the position adjacent to one or more electronic devices 106 which are producing a large amount of heat.

Accordingly, the pipe unit 108 in conjunction with the actuators 502 can transfer heat generated by the electronic devices in an efficient manner by providing more coolant fluid around the position where more heat is generated. This outward deformation of the pipe unit 108 may occur without having to install any sensor to detect temperature around each of the electronic devices 106 since the shape memory spring 504 automatically extends in response to applied heat, which allows the fluid coolant system 100 according to various embodiments to be configured in a simpler and more cost effective manner. Moreover, since the fluid cooling system 100 according to various embodiments may provide more coolant fluid selectively to areas where more heat is generated, it is not necessary to install a coolant pipe with a larger diameter for the purpose of high heat absorption capability, resulting in achieving a more compact fluid cooling system.

Other factors also affect the amount of heat transfer from the electronic devices 106 to the coolant fluid. In general, the amount of heat transferred from a first section to second section may be represented by the following formula:

$$Q = uS(T1-T2)$$

where, "Q" represents the amount of heat transferred from a first section to second section; "u" represents overall heat transfer coefficient; "S" represents heat-transfer area, "T1" represents a temperature in the first section; and "T2" represents a temperature in the first section. This formula may be herein referred to as "heat transfer formula."

Based on the above heat transfer formula, it is understood that the amount of heat transferred from the electronic devices 106 through the mother board 107 increases as the contact area between the mother board 107 and the pipe unit 108 increases. As can be seen in FIGS. 6A and 6B, the shape memory spring 504 may be arranged in parallel with the mother board 107, in one embodiment. As such, in response to the shape memory spring 504 restoring its extended shape, as shown in FIG. 6B, the contact area between the mother board 107 and the pipe unit 108 increases. Thus, by virtue of such an enlarged contacting area with the mother board 107, the pipe unit 108 may absorb more heat at the position where more heat is generated by the electronic devices 106. Accordingly, the shape memory spring 504 arranged in parallel with the mother board 107 may further facilitate absorption of heat generated by electronic devices 106.

Once the coolant fluid dissipates heat from the shape memory spring 504 and the temperature of the shape memory spring 504 returns to a temperature below the transition temperature, the inward tension from the bias spring 506 causes the deformed portion of the pipe unit 108 as well as the shape memory spring 504 to return to its original shape as shown in FIG. 5A.

The other actuators 502b-502d are configured to operate based on the same mechanism as noted above in connection with the heated electronic device 106b. In one embodiment, when the electronic device 106a generates heat sufficient to heat the actuator 502c to a temperature either at or above the transition temperature of the shape memory spring 504 included therein, the shape memory spring 504 in the actuator 502c extends to outwardly deform the adjacent portion of the pipe unit 108, as shown in FIG. 5C. This deformation allows the pipe unit 108 to absorb more heat at the deformed position adjacent to the heated electronic device 106a.

In an embodiment a plurality of the shape memory springs 504 are simultaneously heated above their respective transition temperatures. In this case, each of the heated shape memory spring 504 may extend to deform the pipe unit 108.

Figure 7A:
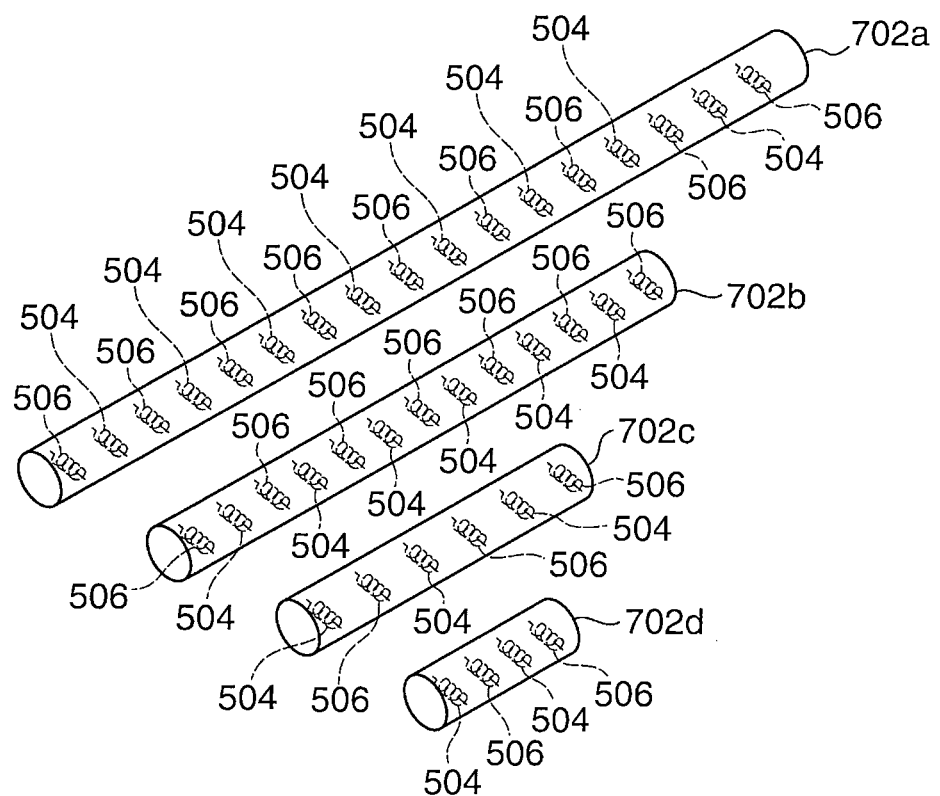
FIG. 7A illustrates one embodiment of the assembly of an example pipe unit.
Figure 7B:
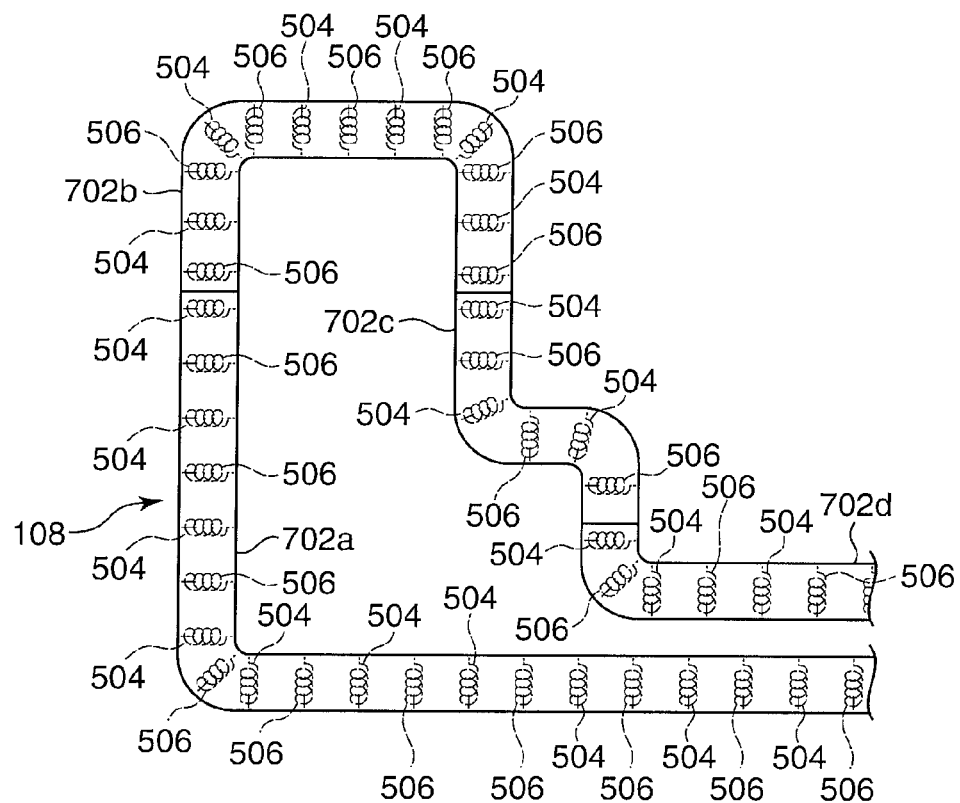
FIG. 7B illustrates one embodiment of the assembly of an example pipe unit.

Turning now to FIGS. 7A and 7B, the assembly of the pipe unit 108 according to one embodiment of this disclosure will be explained. First, a plurality of cylindrical hollow pipe sections 702a-702d are provided. In FIGS. 7A and 7B, first pipe section is labeled 702a; second pipe section is labeled 702b; third pipe section is labeled 702c; and fourth pipe section is labeled 702d. Each of the first, second, third and fourth pipe sections 702a-702d is formed of various types of super elastic alloy or elastomer, as noted above. Then, a plurality of shape memory springs 504 and bias springs 506 are welded on the inner wall of each of the first, second, third and fourth pipe sections 702a-702d using a welding material. In one embodiment, the shape memory springs 504 and bias springs 506 may be arranged alternatively, and each of the resultant pairs of one or more shape memory springs 504 and bias springs 506 forms actuator 502. The shape memory springs 504 may be disposed in each of the first, second, third and fourth pipe sections 702a-702d every 2 centimeters, for example. It may be easier to attach shape memory springs 504 and bias springs 506 before joining the first, second, third and fourth pipe sections 702a-702d than to attach the same after putting together the first, second, third and fourth pipe sections 702a-702d.

Subsequently, each of the first, second, third and fourth pipe sections 702a-702d are joined with one another end to end. For example, as shown in FIG. 7B, the second pipe section 702b may be joined with the first pipe section 702a at one end and also joined with the third pipe section 702c at the other end. Each of the first, second, third and fourth pipe sections 702a-702d may be joined using various conventional techniques. For example, each of the first, second, third and fourth pipe sections 702a-702d may be joined by a joint sleeve and sealed by one or more rubber gaskets intervening between the inner periphery of the sleeve and the outer periphery of the first, second, third and fourth pipe sections 702a-702d.

In the next step, the joined pipe sections may be bent at one or more positions to obtain completed pipe unit 108. The joined pipe sections may be bent so that at least a part of the resulting pipe unit 108 can be disposed such that it is opposite to each of the electronic devices 106 when the pipe unit 108 is mounted on the server module 104. The shape of the completed pipe unit 108 may be readily changed by bending each of the first, second, third and fourth pipe sections 702a-702d at various positions. Thus, the pipe unit 108 may be applied to various kinds of server modules 104 which may have different arrangements of the electronic devices 106 by flexibly changing its shape. It should be appreciated that the bending of the first, second, third and fourth pipe sections 702a-702d may be conducted before jointing those first, second, third and fourth pipe sections 702a-702d.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

Figure 8A:
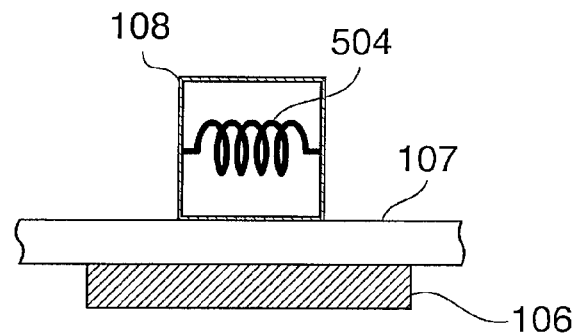
FIG. 8A illustrates another example of cross sectional view cut along with A-A line shown in FIG. 5A.
Figure 8B:
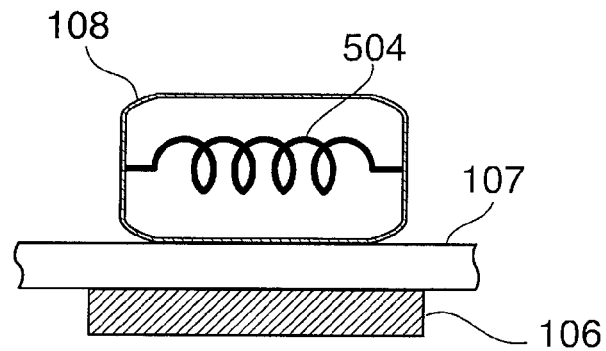
FIG. 8B illustrates another example of a cross sectional view cut along with A-A line shown in FIG. 5A.

For example, FIGS. 8A and 8B illustrate another example of the cross section shape of the pipe unit 108 taken along with A-A line in FIG. 5. As shown in FIG. 8, the cross section of the pipe unit 108 may be formed in a substantially rectangular shape. This rectangular shape increases the contact area between the mother board 107 and the pipe unit 108 as compared to the circular cross section as shown in FIG. 6A. Thus, by virtue of its rectangular cross section shape, the pipe unit 108 may absorb heat from the electronic devices in a more efficient manner.

Figure 9:
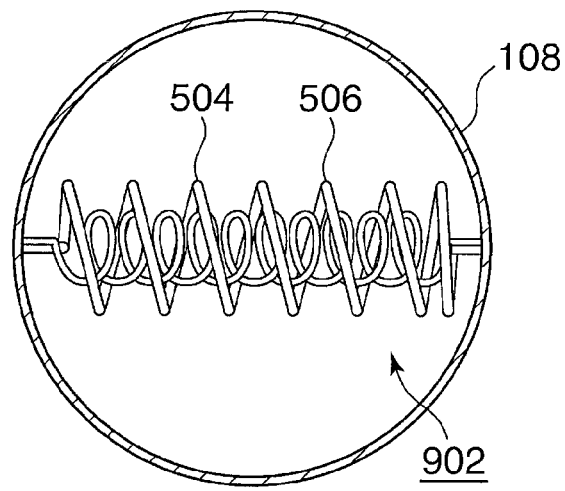
FIG. 9 illustrates a cross sectional view cut along with A-A line shown in FIG. 5A.

The configuration of the actuators 502a-502d may be modified in various manners. For example, FIG. 9 illustrates another example of an actuator in accordance with various embodiments of the disclosure. As shown in FIG. 9, an actuator 902 may comprise a shape memory spring 504 which is disposed in substantially concentric with the bias spring 506. The bias spring 506 may be configured to have a larger diameter than that of the shape memory spring 504 to accommodate the shape memory spring 504. Based on this configuration, more actuators 902 may be disposed over a particular length of the pipe unit 108, which facilitates to cool electronic devices in more efficient manner.

Figure 10A:
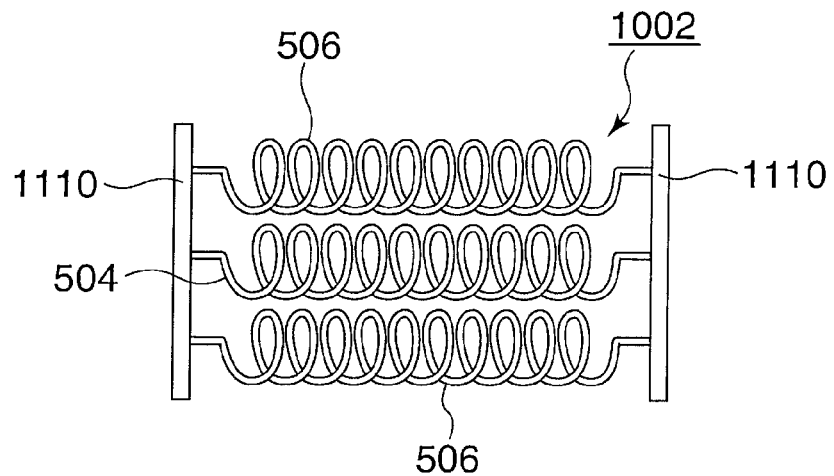
FIG. 10A illustrates a schematic view of an example actuator according to one embodiment.

FIG. 10A illustrates another example of an actuator that may be applied to various embodiments of the disclosure. In one embodiment, an actuator 1002 may be formed as a separate unit from the pipe unit 108. As shown in FIG. 10A, the actuator 1002 comprises a pair of plates 1110 spaced from one another. Disposed between the pair of plates 1110 are a shape memory spring 504 and a pair of bias springs 506. The opposing surfaces of the pair of plates 1110 are connected to one another via the shape memory spring 504 and a pair of bias springs 506B. Both ends of the shape memory spring 504 may be welded on the opposing surfaces of the plates 1110. Similarly, the pair of bias springs 506 may be welded on the same surface of the plates 1110 in substantially parallel with the shape memory spring 504. Each of the pair of plates 1110 may be made of various kinds of resins or metals.

Figure 10B:
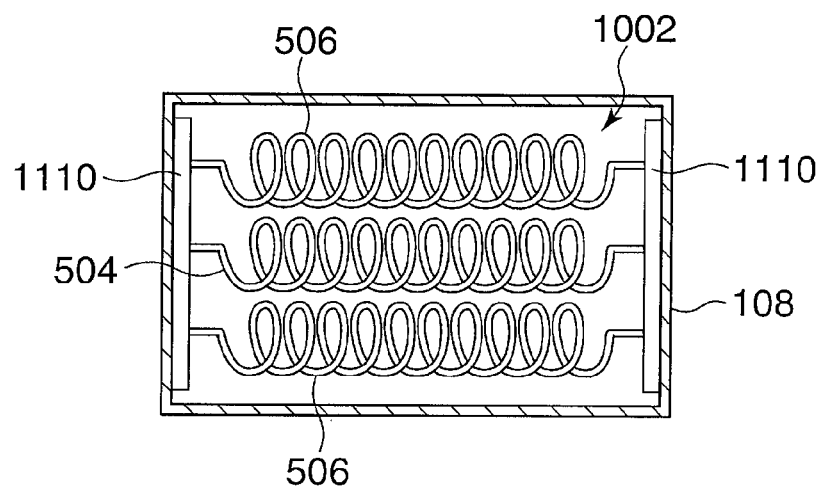
FIG. 10B illustrates a cross sectional view of an example pipe unit according to one embodiment.

As shown in FIG. 10B, the actuator 1002 may be attached in the inner wall of the pipe unit 108 such that the actuator 1002 is opposite to at least one of the electronic devices 106a-106d. In a similar manner to previously described embodiment in relation to the actuator 502, the actuator 1002 may outwardly deform the pipe unit 108 when the shape memory spring is heated to a temperature at or above its transition temperature. It should be understood that the configuration of the actuator 1002 may be modified in various manners without departing from the scope and sprit of the disclosure. For example, the shape memory spring 504 may be arranged concentrically with the bias springs 506.

Figure 11A:
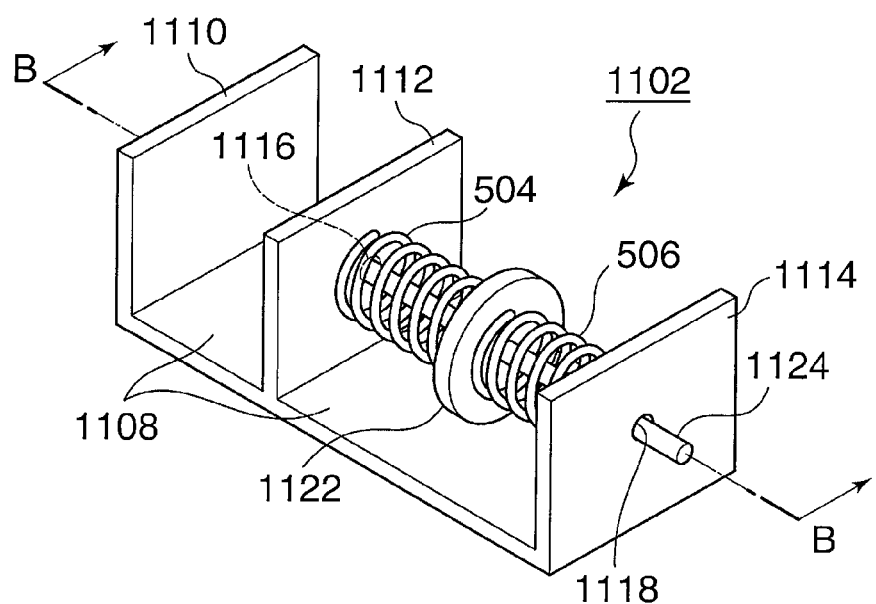
FIG. 11A illustrates a schematic perspective view an example actuator according to one embodiment.
Figure 11B:
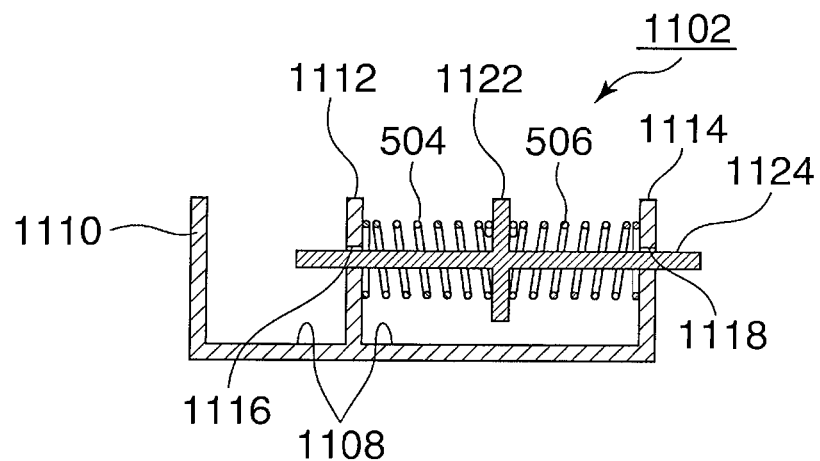
FIG. 11B illustrates a cross sectional view cut along with B-B line shown in FIG. 11A.
Figure 11C:
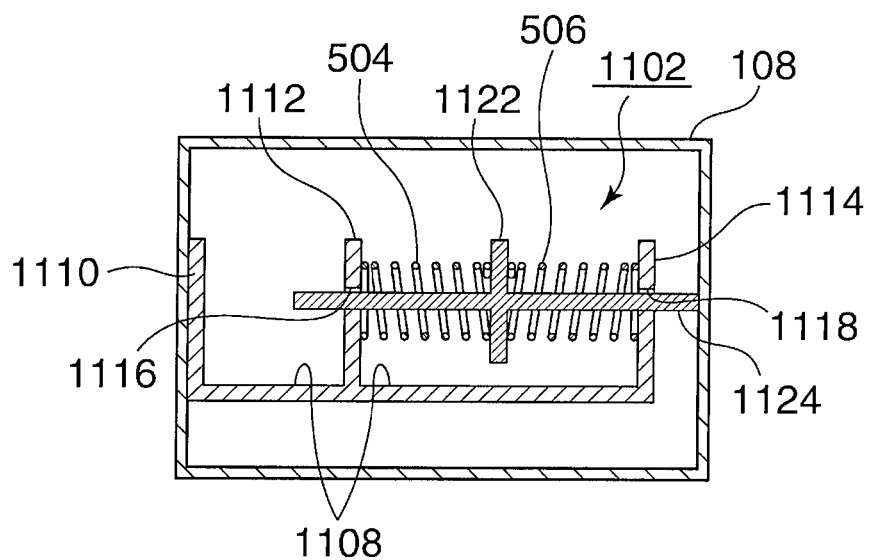
FIG. 11C illustrates a cross sectional view of an example pipe unit according to one embodiment.

FIGS. 11A and 11B show another embodiment of an actuator that may be applied to various embodiments of the disclosure. As shown in FIGS. 11A and 11B, an actuator 1102 comprises a metal floor plate 1108. An attachment wall 1110 and a first and second supporting walls 1112 and 1114 are integrally formed on the floor plate 1108 in substantially parallel manner to one another. Openings 1116 and 1118 are respectively formed on the opposing portions of the first and second supporting walls 1112 and 1114 to slidably accommodate an elongated shaft 1124. A circular flange 1122 is formed integrally with the shaft 1124 in substantially parallel with the first and second supporting walls 1112 and 1114. A shape memory spring 504 is coiled around the shaft 1124 between the first supporting wall 1112 and the opposing surface of the flange 1122. Similarly, a bias spring 506 is coiled around the shaft 1124 and arranged between the opposite side of the flange 1122 and the second supporting wall 1114. Thus, the shape memory spring 504 is arranged in series with the bias spring 506 via the flange around the shaft 1124. As shown in FIG. 11B, the actuator 1102 may be attached to the pipe unit 108 by welding the attachment wall 1110 on the inner wall of the pipe unit 108. The actuator 1102 may be disposed such that the actuator 1102 is opposite to at least one of the electronic devices 106a-106d.

In operation, once the shape memory spring 504 is heated to a temperature either at or above its transition temperature, the shape memory spring 504 may extend to outwardly deform the adjacent portion of the pipe unit 108 so that the pipe unit 108 can absorb more heat at the deformed position. Once the shape memory spring 504 is cooled to a temperature below the transition temperature, an inward bias from the bias spring 506 causes the outwardly deformed pipe unit 108 to return to its original shape.

The fluid cooling system 100 according to various embodiments of this disclosure may be applied to any devices, such as one or a combination of more than one of the following: various kinds of servers including a blade server, a rack server and a tower server; a desktop computer; a laptop computer; a handheld device; a tablet computer; and an electronic book reader.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A fluid cooling system, comprising:
   a pipe unit through which a cooling fluid flows; and
   an actuator disposed on the pipe unit, wherein at least a portion of each of the actuator comprises a shape memory alloy;
   wherein the actuator extends when heated to a temperature either at or above a transition temperature to deform at a least portion of the pipe unit.

2. The fluid cooling system of claim 1, wherein said at least portion of the pipe unit deforms outwardly in a radial direction of the pipe unit.

3. The fluid cooling system of claim 1, wherein the actuator includes a shape memory spring formed of shape memory alloy and a bias spring; wherein the shape memory spring restores a memorized extended shape when heated to a temperature either at or above the transition temperature and is biased by the bias spring in a retracted position when cooled to a temperature below the transition temperature.

4. The fluid cooling system of claim 3, wherein the shape memory spring is arranged substantially parallel to the bias spring.

5. The fluid cooling system of claim 3, wherein the shape memory spring is arranged concentrically with the bias spring.

6. The fluid cooling system of claim 3, wherein the shape memory spring is arranged in series with the bias spring.

7. The fluid cooling system of claim 1, wherein a plurality of actuators are spaced from one another along the longitudinal direction of the pipe unit.

8. The fluid cooling system of claim 1, wherein the pipe unit is mounted on a housing comprising one or more server modules; and wherein said one or more server modules include one or more electronic devices which are provided on at least one side of a mother board.

9. The fluid cooling system of claim 8, wherein the one or more electronic devices are mounted on one side on the mother board and the pipe unit is mounted on opposite side of the mother board.

10. The fluid cooling system of claim 9, wherein the pipe unit is arranged such that at least a part of the pipe unit is opposite to the one or more electronic devices.

11. The fluid cooling system of claim 8, wherein the shape memory spring is configured to be heated to a temperature either at or above the transition temperature by thermal conduction from at least one of the one or more electronic devices.

12. The fluid cooling system of claim 8, wherein the shape memory spring is arranged such that the shape memory spring extends in a direction parallel to the mother board.

13. The fluid cooling system of claim 7, wherein the shape memory spring is formed of an alloy selected from the group consisting of Ni—Ti alloy, Ni—Ti—Fe alloy, Ni—Ti—Cu alloy, and combinations thereof.

14. The fluid cooling system of claim 1, wherein the pipe unit is formed of a super elastic alloy.

15. The fluid cooling system of claim 14, wherein the super elastic alloy is selected from the group consisting of Ni—Ti alloy, Ni—Ti—Fe alloy, Ni—Ti—Cu alloy, and combinations thereof.

16. The fluid cooling system of claim 15, wherein the shape memory spring is welded to the pipe unit using a welding material formed of a same type of a super elastic alloy as that of the pipe unit.

17. The fluid cooling system of claim 1, wherein the pipe unit is formed of an elastomer.

18. The fluid cooling system of claim 17, wherein the elastomer is selected from the group consisting of fluorinated elastomer, silicon elastomer, perfluoroelastomer, aramid elastomer, and combinations thereof.

19. The fluid cooling system of claim 1, further comprising a pump for supplying the cooling fluid.

20. The fluid cooling system of claim 19, further comprising a radiator connected to the pump for dissipating heat from the cooling fluid.

21. The fluid cooling system of claim 1, wherein the cooling fluid substantially comprises water.

22. The fluid cooling system of claim 1, wherein the cooling fluid substantially comprises oil.

23. A method for assembling a pipe unit for a fluid cooling system, comprising:
   providing a pipe section;
   attaching a first spring formed of a shape memory alloy and a bias spring; and
   joining a plurality of the pipe sections end to end.

24. A pipe section, comprising:
   an elongated body having a shape to allow a fluid to flow; and
   an actuator disposed on the elongated body, wherein at least a portion of the actuator is formed of a shape memory alloy;
   wherein the actuator extends when heated to a temperature to either at or above a transition temperature to deform at least portions of the elongated body.

* * * * *

UNITED STATES PATENT AND TRADEMARK OFFICE
CERTIFICATE OF CORRECTION

| | | |
|---|---|---|
| PATENT NO. | : 8,416,573 B2 | Page 1 of 1 |
| APPLICATION NO. | : 13/122877 | |
| DATED | : April 9, 2013 | |
| INVENTOR(S) | : Hamano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 212 days.

In the Specification

In Column 3, Line 16, delete "DESCRIPTION" and insert -- DETAILED DESCRIPTION --, therefor.

In Column 4, Line 44, delete "FIG. 5A-5C" and insert -- FIGS. 5A-5C --, therefor.

In Column 8, Line 62, delete "506B." and insert -- 506. --, therefor.

Signed and Sealed this
Thirtieth Day of July, 2013

Teresa Stanek Rea
*Acting Director of the United States Patent and Trademark Office*